F. G. CLARKE.
CLOTHES POUNDER.

No. 175,240. Patented March 28, 1876.

WITNESSES  
Phil. W. Hale,  
R. K. Evans

INVENTOR  
Francis G. Clarke.  
by A. N. Evans & Co.  
Attys

UNITED STATES PATENT OFFICE.

FRANCIS G. CLARKE, OF MOUNT VERNON, OHIO, ASSIGNOR OF ONE-HALF HIS RIGHT TO BENJAMIN A. F. GREER, OF SAME PLACE.

IMPROVEMENT IN CLOTHES-POUNDERS.

Specification forming part of Letters Patent No. 175,240, dated March 28, 1876; application filed February 25, 1876.

*To all whom it may concern:*

Be it known that I, FRANCIS G. CLARKE, of Mount Vernon, in the county of Knox and State of Ohio, have invented a new and Improved Device for Washing Clothes; and I hereby declare the following to be a full, clear, and exact description thereof, reference being had to the accompanying drawings, making part of this specification, in which—

Figure 1:
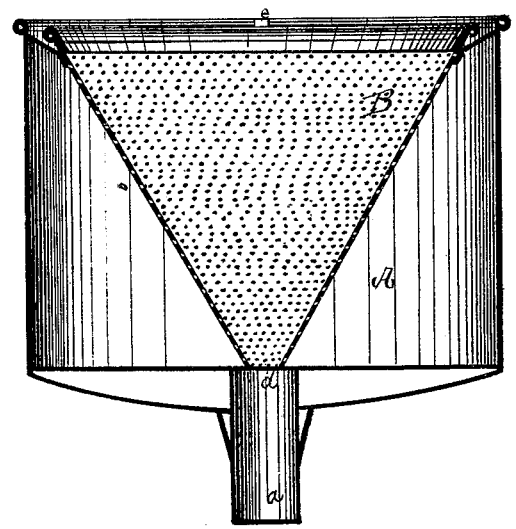
Figure 2:
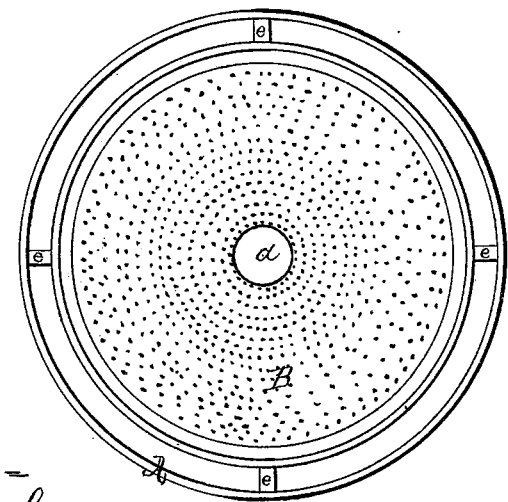

Figure 1 is an inverted vertical sectional view of my device. Fig. 2 is a plan of the under side of my device.

The object of my invention is to produce an agitator or plunger to wash clothes, and thereby avoid the necessity of rubbing them; and my invention consists of a hollow cylindrical jacket containing a perforated cone, and provided with a handle to operate it, as hereinafter more fully described and claimed.

In order that those skilled in the art may make and use my invention, I will proceed to describe the manner in which I have carried it out.

In the said drawings, A is an open-mouthed cylindrical cup, provided with a socket, *a*, for the reception of a staff or handle. Within the cup A is fastened a perforated sheet-metal cone, B, in its greatest diameter being somewhat less than the diameter of the cup A. The apex of this perforated cone is soldered to the top of the cup A, at its center *d*, and braces *e e* connect the lips of the two.

The handle being inserted at *a*, and the clothes placed in a tub with water and soap, the operation is as follows: The cup and cone are worked up and down alternately on top of the clothes, and this movement causes an atmospheric pressure, which forces the water violently through the clothing, and, when withdrawn, creating a vacuum, which causes the water to rush through again, thus driving out the dirt with great facility, without subjecting the clothes to the wear and tear of the ordinary process of washing.

Having thus described my invention, what I claim as new, and desire to secure by Letters Patent, is—

A washing device consisting of the cylindrical open-mouthed cup A, in combination with the internal perforated vessel of smaller diameter, substantially as set forth.

FRANCIS G. CLARKE.

Witnesses:
 BENJ. A. F. GREER,
 CLARENCE G. SNOOK.